US009904893B2

(12) United States Patent
Veeramachaneni et al.

(10) Patent No.: US 9,904,893 B2
(45) Date of Patent: *Feb. 27, 2018

(54) METHOD AND SYSTEM FOR TRAINING A BIG DATA MACHINE TO DEFEND

(71) Applicant: Patternex, Inc., San Jose, CA (US)

(72) Inventors: Uday Veeramachaneni, San Jose, CA (US); Vamsi Korrapati, San Jose, CA (US); Constantinos Bassias, San Jose, CA (US); Ignacio Arnaldo, San Jose, CA (US); Ke Li, San Jose, CA (US)

(73) Assignee: Patternex, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/382,413

(22) Filed: Dec. 16, 2016

(65) Prior Publication Data
US 2017/0169360 A1 Jun. 15, 2017

Related U.S. Application Data

(63) Continuation-in-part of application No. 15/258,797, filed on Sep. 7, 2016, and a continuation-in-part of application No. 14/532,812, filed on Nov. 4, 2014, now abandoned.

(60) Provisional application No. 62/340,388, filed on May 23, 2016, provisional application No. 61/807,699, filed on Apr. 2, 2013.

(51) Int. Cl.
*G06F 21/00* (2013.01)
*G06N 99/00* (2010.01)
*G06F 21/56* (2013.01)

(52) U.S. Cl.
CPC .......... *G06N 99/005* (2013.01); *G06F 21/56* (2013.01)

(58) Field of Classification Search
USPC ........................................................ 726/23
See application file for complete search history.

(56) References Cited

U.S. PATENT DOCUMENTS

| 8,418,249 | B1 * | 4/2013 | Nucci | G06F 21/552 706/20 |
| 2008/0168135 | A1 * | 7/2008 | Redlich | G06Q 10/10 709/204 |
| 2008/0229415 | A1 * | 9/2008 | Kapoor | G06F 21/55 726/22 |
| 2012/0137367 | A1 * | 5/2012 | Dupont | G06F 21/00 726/25 |

(Continued)

Primary Examiner — Jason Lee
(74) Attorney, Agent, or Firm — Hulsey, P.C.

(57) ABSTRACT

Disclosed herein are a method and system for training a big data machine to defend, retrieve log lines belonging to log line parameters of a system's data source and from incoming data traffic, compute features from the log lines, apply an adaptive rules model with identified threat labels produce a features matrix, identify statistical outliers from execution of statistical outlier detection methods, and may generate an outlier scores matrix. Embodiments may combine a top scores model and a probability model to create a single top scores vector. The single top scores vector and the adaptive rules model may be displayed on a GUI for labeling of malicious or non-malicious scores. Labeled output may be transformed into a labeled features matrix to create a supervised learning module for detecting new threats in real time and reducing the time elapsed between threat detection of the enterprise or e-commerce system.

19 Claims, 8 Drawing Sheets

(56) References Cited

U.S. PATENT DOCUMENTS

2013/0318584 A1* 11/2013 Narayanan .............. G06F 21/50
 726/7
2014/0278435 A1* 9/2014 Ganong, III ............ G10L 15/22
 704/275

* cited by examiner

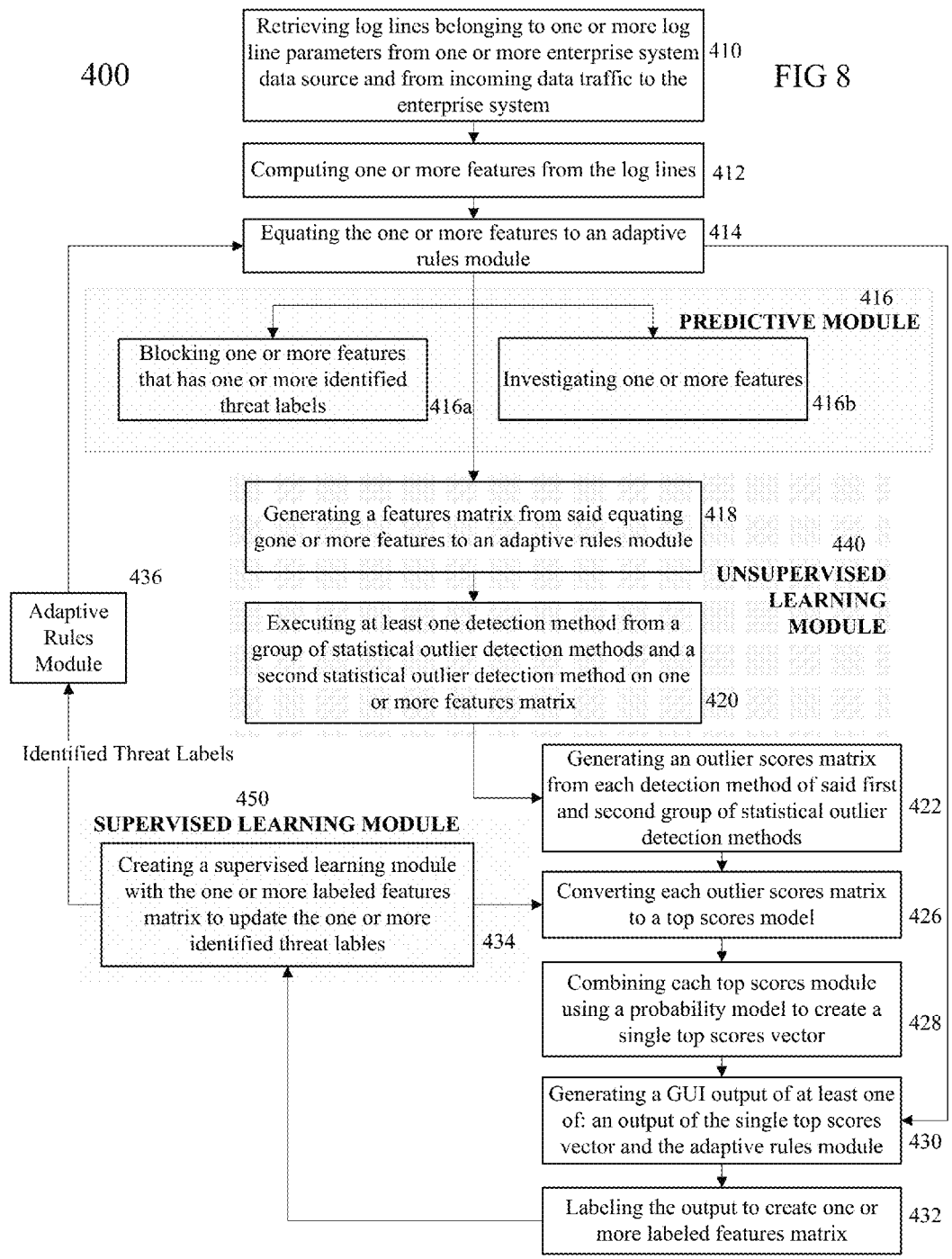

APPLY MODELS: Given the entity-feature matrix $M_t$ at time $t$, deploy and execute the models $U_{t-1}$ and $S_{t-1}$:
  STEP 1A: Apply the unsupervised model $U_{t-1}$ to $M_t$ and generate scores given by P.
  STEP 1B: Apply the supervised model $S_t$ to $M_t$ and generate scores given by Z.

SELECT $k$ ENTITIES: Given analyst bandwidth $k$, scores from unsupervised model, P, and the supervised model Z:
  STEP 2A: Select top $\frac{k}{2}$ entities based on the score P.
  STEP 2B: Select top $\frac{k}{2}$ entities based on the score Z.

COLLECT FEEDBACK AND UPDATE: Show the $k$ entities to the analyst and collect feedback:
  STEP 3: For each of the $k$ entities collect analyst defined labels and add $D_t$ it to the labeled training data $D_L = D_L \cup D_{t-1}$
TRAINING: Given the entity-feature matrix $M_t$ at time $t$, and *labeled* data $D_L$:
  STEP 4A: Train an unsupervised model $U_t$ using $M_t$. The unsupervised training includes multiple modeling techniques and an ensembling method described in Section 6.
  STEP 4B: If labeled data, $D_L$, is available, train a supervised model $S_t$ using a random forest classifier.

FIG 9

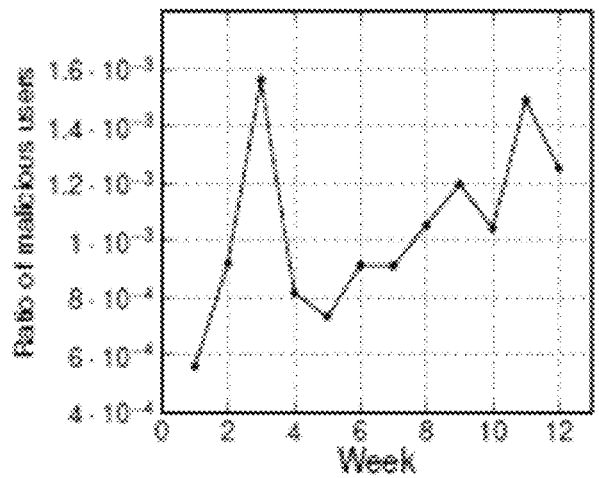

METHOD AND SYSTEM FOR TRAINING A BIG DATA MACHINE TO DEFEND

CROSS REFERENCE TO RELATED APPLICATIONS

This application claims benefit to the provisional application No. 62/340,388 filed May 23, 2016.

This application claims priority to the U.S. Non-Provisional application Ser. No. 15/258,797 filed Sep. 7, 2016.

This application claims priority to U.S. Non-Provisional application Ser. No. 14/532,812, filed Nov. 4, 2014, which claims priority to U.S. Provisional Patent Application No. 61/807,699 filed Apr. 2, 2013.

All of the prior applications are incorporated herein in their entirety by reference.

FIELD OF THE INVENTION

The present disclosure relates generally to a security analyst driven and machine learning driven computer security system and method for detecting threats by creating statistical rules using statistical outliers for one or more enterprise or e-commerce systems.

BACKGROUND OF THE ART

Electronic information across networks is a crucial aspect of an enterprise or e-commerce system. However, such electronic information may expose these systems to security threats. Hackers are constantly changing their behavior by figuring out current rules and designing newer attacks that can sidestep detection.

In current technology, information security solutions generally fall into two categories: security analyst-driven and unsupervised machine learning-driven. Security analyst-driven solutions rely on rules determined by fraud and security experts, and exhibit high rates of undetected attacks. This solution also leads to delays between attack detection and implantation of preventative countermeasures. These delays are both costly and time-consuming for the enterprise or e-commerce systems.

Unsupervised machine learning-driven solutions can lead to detection of rare or anomalous patterns and may also lead to improved detection of new attacks. However, these solutions trigger more false positive alarms and alerts. These false positives require increased rates of substantial investigative efforts before they are dismissed.

Existing enterprises or e-commerce systems lack labeled threat examples from previous attacks, undercutting the ability to use supervised learning models. Due to the constant changing of an attacker's behavior, these models become irrelevant.

As a result, many enterprise and e-commerce systems using existing technology remain exposed to security threats, and improved security systems are needed to provide real time identification of threats.

Another challenge imposed by existing technology is resultant from malicious activities being extremely rare. Attack cases represent a minor fraction of total events, generally <0.1%. To illustrate this fact, FIG. 10 shows the ratio of reported malicious users to the total number of active users in the studied dataset.

The dearth of malicious activities results in extreme class imbalance when learning a supervised model, and increases the difficulty of the detection process. Not all malicious activities are systematically reported, either because their incident responses were inconclusive, or because they were not detected in the first place. This includes noise into the data, since unreported attacks will be considered legitimate activity. Attack vectors can take a wide variety of shapes. Even when malicious activities are reported, the users are not always aware of the specific vectors involved. Therefore, difficulty arises in developing robust defense strategies that are capable of detecting as many attacks as possible.

Importantly, there is a need for a method and system capable of detecting threats in real time, and collecting analysts' feedback to improve detection rates over time.

From such information gathering, there is a need for an active learning method that reduces the false positives for the detected threats.

There is, further, a need for a system that incorporates behavioral predictive analytics for network intrusion and internal threat detection.

Now, a method and system capable of addressing real-time security system threats may have application in a broad array of active learning and machine learning applications that are of value and benefit to the information system security professionals. Accordingly, the scope of the present disclosure extends beyond the collecting and detecting of threats.

BRIEF SUMMARY OF THE INVENTION

The present disclosure details an end-to-end system that learns over time from feedback from a security analyst, hereafter referred as analyst. The system may include a big data processing system, an outlier detection system, a feedback mechanism, a continuous learning system and a supervised learning module.

The big data processing system comprises a platform that may quantify the features of different entities and compute them from raw data. With high-volume, high-velocity data, this first component requires processing at a challenging scale.

An exemplary outlier detection system may learn a descriptive model of those features extracted from the data via unsupervised learning, using one or more of a joint probability density, matrix decomposition or replicator neural network outlier detection system. To achieve confidence and robustness when detecting rare and extreme events, the system may fuse multiple scores into a final score that indicates how far a certain entity's or event's probability is from the others.

The feedback mechanism and continuing learning system may incorporate an analyst's input through a user interface. The feedback mechanism and continuing learning system may present the top outlier events or entities and ask the analyst to provide input indicating if a specific combination of features is, or is not, malicious. This feedback may then feed into the supervised learning module. The number of outlier events examined and the feedback frequency (e.g. daily or weekly) are both decided by the analyst.

The supervised learning module may receive the analyst's feedback, learn a model that predicts whether a new incoming event is normal or malicious, and may continually refine the model as more feedback is gathered.

In some embodiments, the supervised learning module may have access to labeled features from the past, historical labels, even before the detection system is deployed. An additional parameter, $d \in \{0,28\}$ may be introduced to represent the number of days for which the labeled examples are available. For each strategy, the total number of detected attacks, the recall, and the area under the area under the receiver operating characteristic curve (AUC) of the deployed classifier may be reported on a monthly basis.

FIG. 11 shows the detection rates achieved with analyst based features, where the analyst may have a fixed daily feedback frequency equal to or less than 100 incident investigations. The present disclosure apparatus detected more attacks than a fully unsupervised outlier detection apparatus. Over a 12-week simulation, the outlier detection approach detected a total of 42 attacks. The present disclosure apparatus detected 143 attacks at d=0 and 211 attacks at d=28, out of a total of 318 attacks successfully linked to individual users.

The detection rate of the present disclosure with d=0 and d=28 increases over time, reaching 0.500 and 0.604 respectively at the $12^{th}$ and final week.

The performance of the classifiers at the end of the $12^{th}$ week was approximately identical among the three setups of the present disclosure. In the case of d=0, the AUC of the classifier in the final week reached 0.940. The setup of d=28 reached 0.946 of the present disclosure.

The present disclosure may defend against unseen attacks and may be bootstrapped without labeled features. Given enough interactions with the analyst, the present disclosure may reach a performance similar to that obtained when historic attack examples are available.

While the present disclosure is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

In light of the present disclosure, here appears a method and system for training a big data machine to defend that properly addresses the seriousness of detecting threats in real time.

The present disclosure provides a method and system for training a big data machine to defend an enterprise system. The method and system provide for retrieving log lines belonging to one or more log line parameters from one or more enterprise data source and from incoming data traffic to the enterprise. The method and system may further provide for computing one or more features from the log lines which includes one or more statistical processes. The one or more features may be applied to an adaptive rules model. The adaptive rules model may comprise one or more identified threat labels.

In some embodiments, applying the one or more features to an adaptive rules model may include a step of blocking one or more features that has one or more identified threat labels, investigating one or more features, or a combination thereof. The output of the one or more features that may not have a labeled threat may be incorporated into a features matrix.

In some embodiments, identification of a set of statistical outliers may include at least one detection method.

In some embodiments, identification of a set of statistical outliers may include at least a second detection method.

In some embodiments, an outlier scores matrix may be generated from each detection method of said first and second group of statistical outlier detection methods.

Embodiments of the present disclosure may convert each outlier scores matrix to a top scores model. Some embodiments may further combine each top scores model using a probability model to create a single top scores vector. Some embodiments may output the single top scores vector and the adaptive rules model via a GUI.

Embodiments of the present disclosure may label the output of the single top scores vector and the adaptive rules model to create one or more labeled features matrix. By creating this labeled features matrix, a supervised learning module may be provided with this matrix to update the one or more identified threat labels.

Embodiments of the present disclosure further refines the adaptive rules model for identification of statistical outliers and prevents access via categorized threats by detecting new threats in real time and reducing the time elapsed between threat detection of the enterprise system.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

Figure 1:
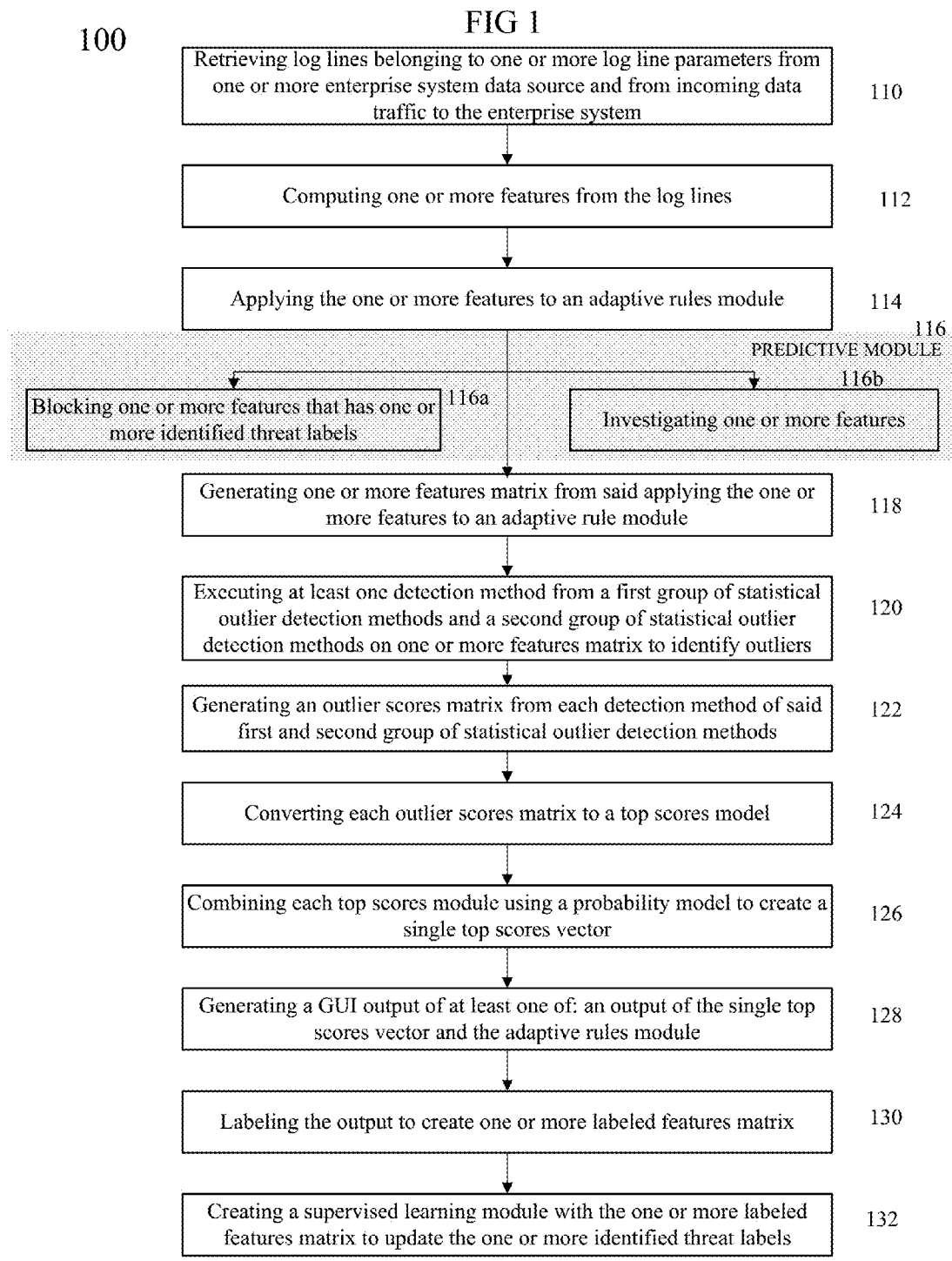
Figure 2:
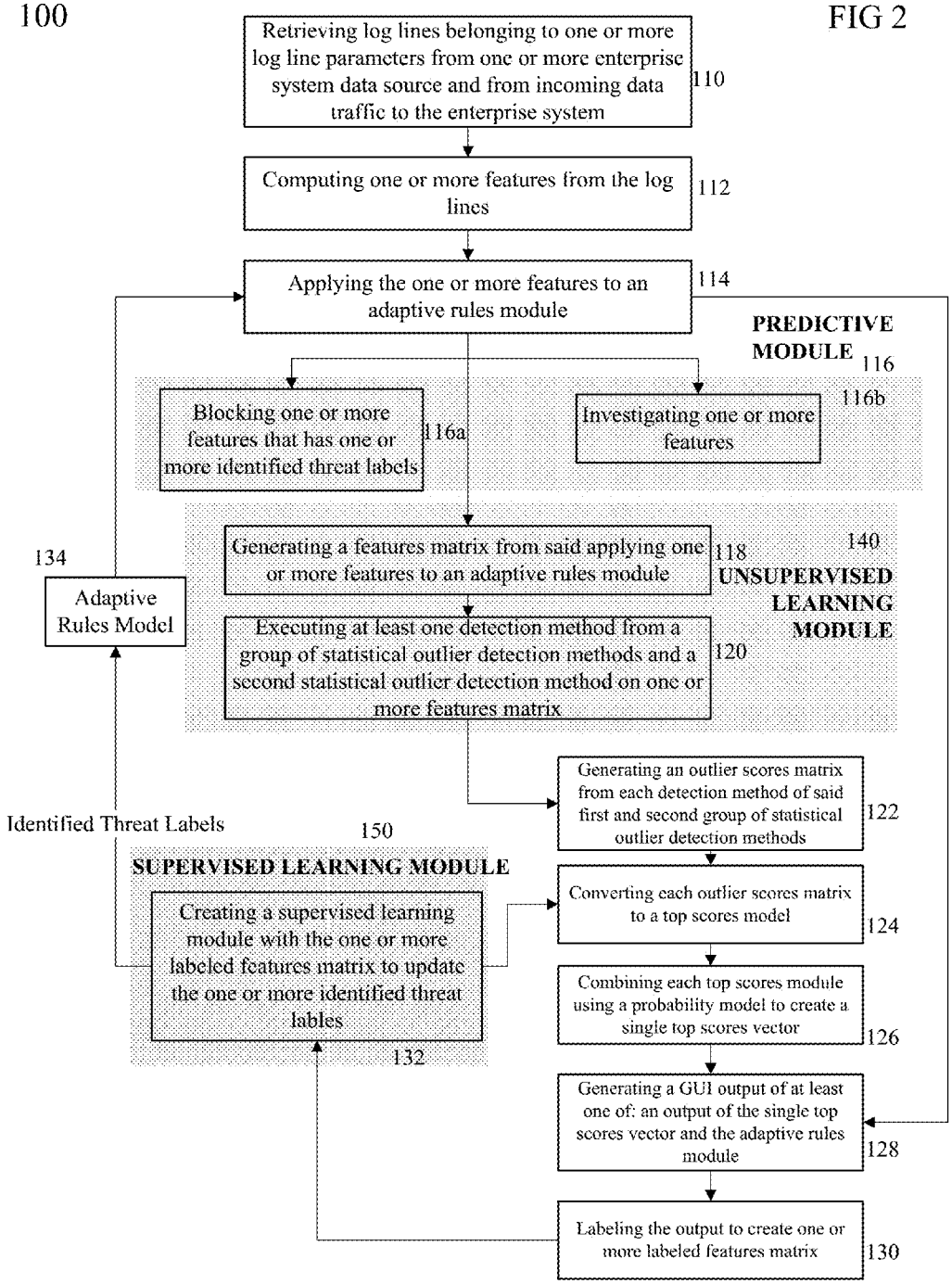

Having thus described the invention in general terms, reference will now be made to the accompanying drawings, which are not necessarily drawn to scale, and wherein:

FIG. 1 depicts a general flow diagram illustrating a method for training a big data machine to defend, in accordance with some embodiments;

FIG. 2 depicts a flow diagram illustrating a method for training a big data machine to defend, outlining the supervised and unsupervised learning modules, in accordance with some embodiments.

Figure 3:
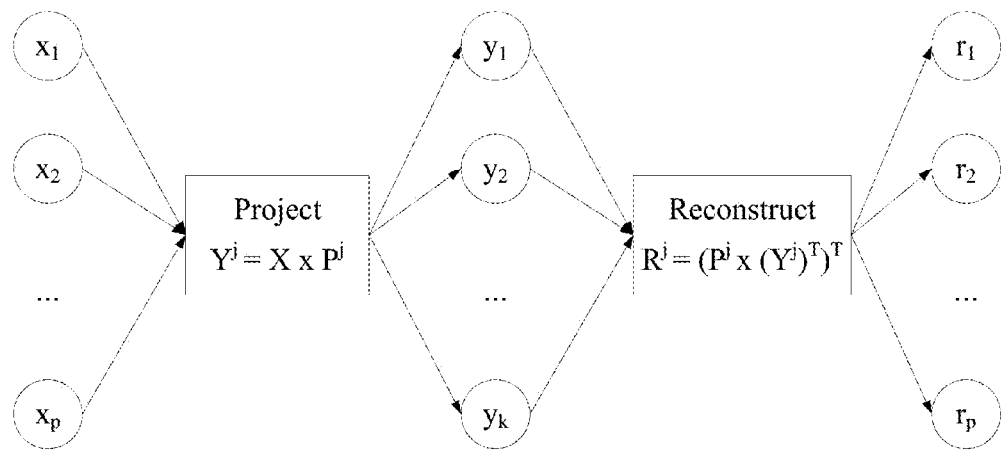

FIG. 3 shows a matrix decomposition outlier detection method, in accordance with some embodiments.

Figure 4:
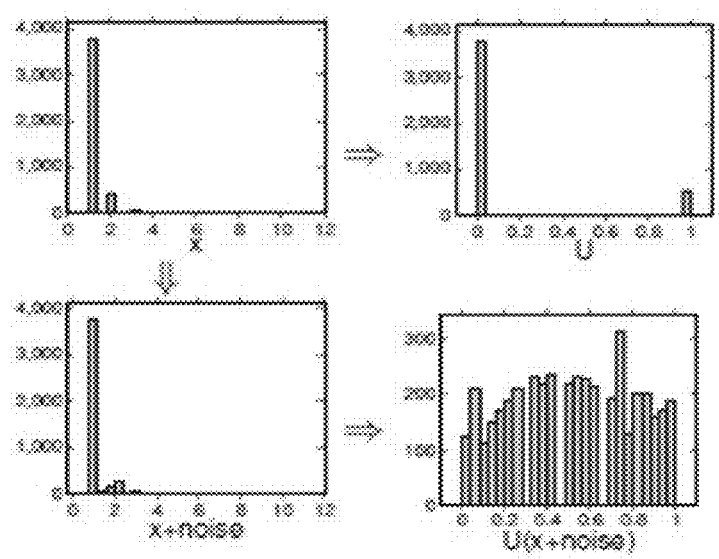

FIG. 4 shows graphs of adding additive white Gaussian noise to features, in accordance with some embodiments.

Figure 5:
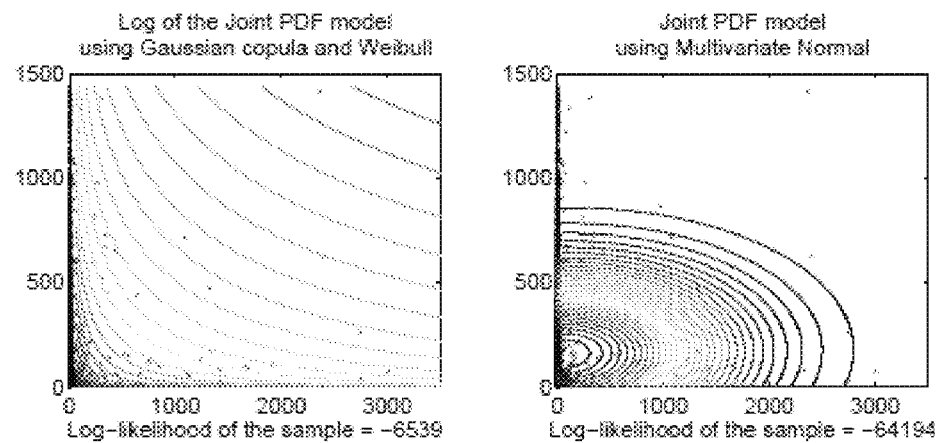

FIG. 5 shows contour lines of the log PDF of a joint Gaussian copula probability density model with Weibull marginals and contour lines of a bi-variate normal fitted to the data, in accordance with some embodiments.

Figure 6:
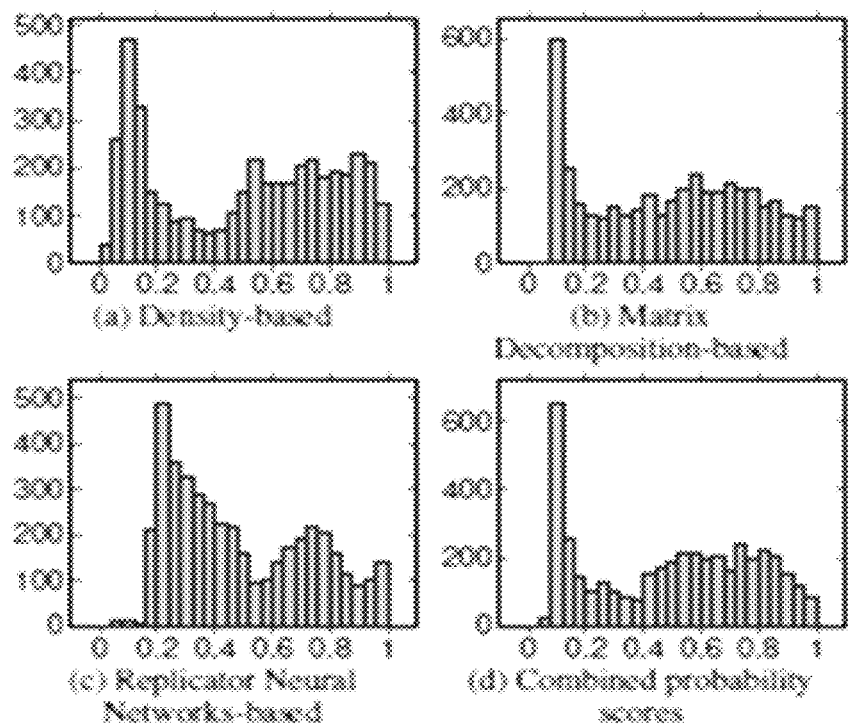

FIG. 6 shows a day's worth of data plots of histograms for the outlier scores from the outlier detection methods and the histogram of the combined score, in accordance with some embodiments.

Figure 7:
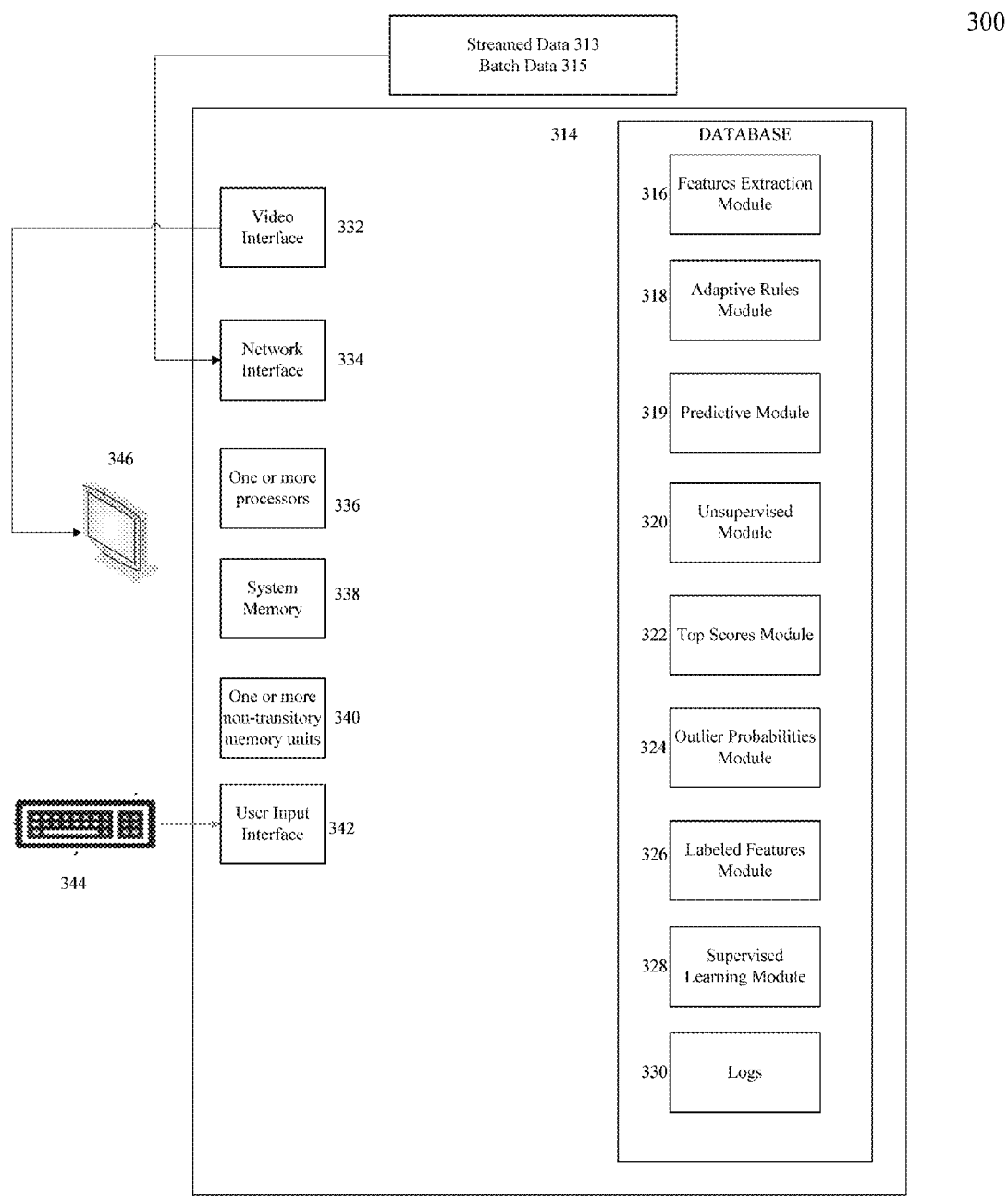

FIG. 7 depicts a block diagram illustrating an apparatus of training a big data machine to defend, in accordance with some embodiments.

FIG. 8 depicts a block diagram of a method for training a big data machine to defend, in accordance with some embodiments.

FIG. 9 shows an Active Model Synthesis algorithm, in accordance with some embodiments.

FIG. 10 shows a weekly ratio of reported malicious users to the total number of active users.

Figure 11:
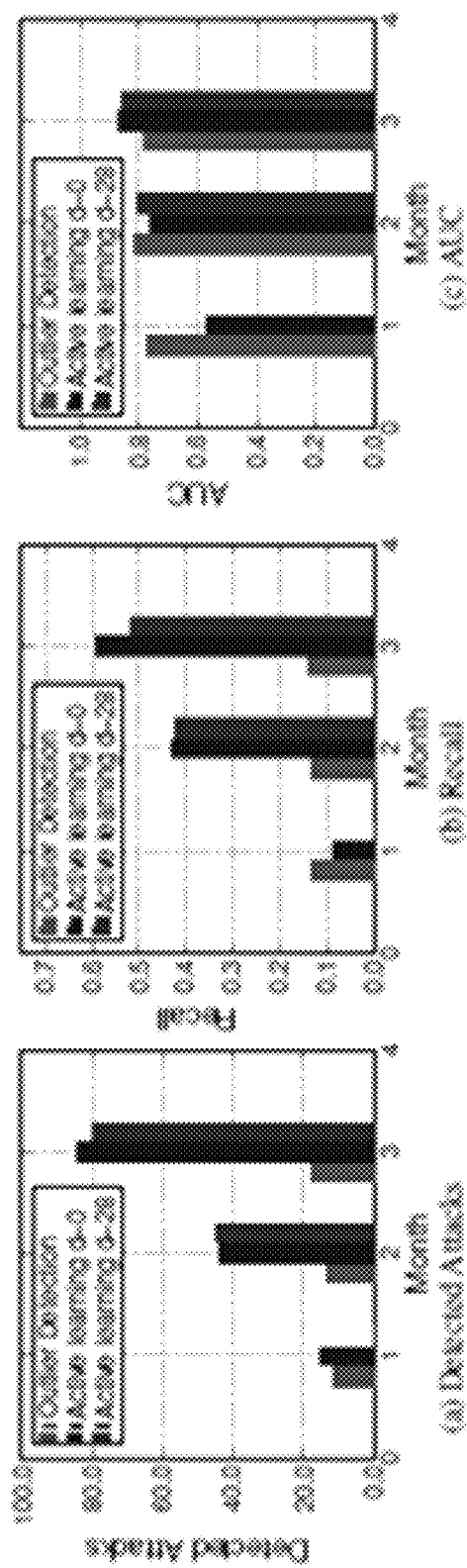

FIG. 11 shows detection rates of an active learning system.

DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all the possible embodiments and contexts of the invention in this disclosure. Upon reading this disclosure, many alternative embodiments of the present invention will be apparent to the persons of ordinary skill in the art.

Embodiments of the present invention may process both web logs, firewall logs, or a combination of the two. In a typical enterprise or e-commerce system, logs may be delivered in real, streaming time from widely distributed sources. Typically, but not exclusively, web log analysis may facilitate the detection of web attacks. Typically, but not exclusively, mining firewall logs may facilitate the prevention of data ex-filtration in the enterprise or e-commerce setups.

FIG. 1 details a block diagram illustrating an exemplary method for training a big data system to defend an enterprise or e-commerce system, in accordance with some embodiments.

As shown, processing begins at 110, whereupon log lines belonging to one or more log line parameters from one or more enterprise or e-commerce system data source and/or from incoming data traffic to the enterprise or e-commerce system. The one or more enterprises or e-commerce system data sources comprises at least one of: web server access logs, firewall logs, packet captures per application, active directory logs, DNS logs, forward proxy logs, external threat feeds, AV logs, user logon audits, DLP logs, LB logs, IPS/IDS logs, black listed URLs, black listed IP addresses, and black listed referrers. The one or more log line parameters comprises at least one of: user ID, session, IP address, and URL query.

Process flow continues to 112, wherein one or more features are computed from the grouped log lines. Feature extraction may include activity tracking, activity aggregation, or a combination thereof. As disclosed herein, embodiments performing activity tracking may absorb log stream generated by the platform, identify the entities involved in each log line, e.g. IP address, user etc., and update the corresponding activity records. These activity records may then be calculated and stored according to system guidelines. In one guideline arrangement, activity records are calculated and stored in accordance with a short temporal window. For example, the temporal window over which these activity records may be computed and stored may be in one-minute increments. This way, the computation of behavioral features are computed for different time intervals: −30 minutes, 1 hour, 12 hours and 24 hours. This allows flexibility in analysis.

In a further guideline arrangement, activity records are calculated and stored for streamlined, efficient retrieval of the user data necessary for feature computation. Depending on the definition of the feature, aggregating activity records for a larger time window may include anything from simple counters to complex data structures.

In activity aggregation, computing behavioral features over an interval of time may require two steps, the first step being retrieving all activity records that fall within the given interval. The behavioral descriptors are aggregated over 24 hours and end at the time of the last user activity. This can be graphically represented as a rolling 24-hour window for feature computation. The second step is to aggregate minute-by-minute activity records as the feature demands. Again, this aggregation step depends on the feature type. In the simplest step, counters, one must merely add all the minute-by-minute values together. The more complex case of unique values requires retrieving the unique values of a super set formed by the minute-to-minute sets.

Continuing the process flow, the one or more features may be applied to an adaptive rules model at block 114. At block 114, an embodiment may compare the one or more features to predetermined adaptive rules of malicious activities, non-malicious activities or any predetermined rule. A predictive module 116 may block one or more features that has one or more identified threat labels 116a, investigate one or more features 116b, or a combination thereof. Blocking one or more features may prevent a malicious activity by issuing a warning to the system, analyst, or a combination thereof. Investigating one or more features may involve an analyst investigating a labeled feature and determining if the label is correctly or incorrectly labeled, changing the label, or a combination thereof. At block 118 a features matrix may be generated from applying the one or more features to the adaptive rules model. In the features matrix, the one or more features make up the columns and the one or more log line parameters make up the rows. The features matrix, organized or grouped by sessions, comprises at least one of: user session duration, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, and percentage of head requests in user session. The features of a features matrix, organized or grouped by URL queries, comprises at least one of: length of user URL query, number of characters of user URL query, number of digits of user URL query, and number of punctuations of URL query. The features of a features matrix, organized or grouped by user ID, comprises at least one of: number of checkouts, number of credit cards added, number of promo codes added, number of gift cards added, number of times items were shipped overnight, and number of times new shipping address was added. The features of a features matrix, organized or grouped by IP address, comprises at least one of: number of login failures, number of login successes, number of password resets, and total number of requests.

At block 120, process flow continues with performing at least one detection method from a first group of statistical outlier detection methods, and performing at least a second detection method from a second group of statistical outlier detection methods on the one or more features matrix to identify statistical outliers. The first group of statistical outlier detection methods comprises at least one of: matrix decomposition-based outlier process, a replicator neural networks process, and a joint probability density process. The second group of statistical outlier detection methods comprises at least one of: matrix decomposition-based outlier process, a replicator neural networks process and a joint probability density process.

Shown in FIG. 3 is the matrix decomposition-based outlier process. Embodiments may employ the use of Principal Component Analysis to find cases that violate the correlation structure of the main bulk of data. To detect these rare cases, PCA-based methods may analyze the projection from original variables to the principal components' space, followed by the inverse projection or reconstruction from principal components to the original variable. When only the first principal components that explain most of the variance in data are used for projection and reconstruction, it is ensured that the reconstruction error will be low for the majority of the examples. This may be done while remaining high for outliers due to the first principal components explaining the variance of normal cases and the last principal components explaining the outlier variance.

Further defining the matrix decomposition-based outlier process, X is a p-dimensional dataset. Its covariance matrix $\Sigma$ can be decomposed as: $\Sigma = P \times D \times P^T$, where P is an orthonormal matrix where the columns are the eigenvectors of $\Sigma$, and D is the diagonal matrix containing the corresponding eigenvalues $\lambda_1 \ldots \lambda_p$. Graphically, an eigenvector can be seen as a line in 2D space, or a plane in higher dimensionally spaces, while its corresponding eigenvalue indicates how much the data is stretched in that direction. Note that, at this stage, some embodiments may sort the columns of the eigenvector matrix P and eigenvalue matrix D in order of decreasing eigenvalues. In other words, the eigenvectors and their corresponding eigenvalues are sorted in decreasing order of significance: the first eigenvector accounts for the most variance, the second for the second-most, etc. The projection of the dataset into the principal component space is given by Y=XP. This projection can be performed with a reduced number of principal components. Let $Y^j$ be the projected dataset using the top j principal components: $Y^j = X \times P^j$. In the same way, the reverse projection, from the principal component space to the original space, is given by $R^j = (P^j \times (Y^j)^T)^T$, where $R^j$ is the reconstructed dataset using the top j principal components. This process is schematically depicted in FIG. 3.

The outlier score of point $X_i = [x_{i1} \ldots x_{ip}]$ may be defined as:

$$\text{score}(X_i) = \sum_{j=1}^{p} (|X_i - R_i^j|) \times ev(j) \qquad (1)$$

$$ev(j) = \frac{\sum_{k=1}^{j} \lambda_k}{\sum_{k=1}^{p} \lambda_k} \qquad (2)$$

Note that ev(j) represents the percentage of variance explained with the top j principal components. As stated above, eigenvalues may be sorted in decreasing order of significance; therefore ev(j) will be monotonically increasing. This means that, the higher is j, the most variance will be accounted for within the components from 1 to j. With this outlier score definition, large deviations in the top principal components are not heavily weighted, while deviations in the last principal components are. This way, outliers may present large deviations in the last principal components, and thus may receive high scores.

The second outlier detection process that may be employed by an embodiment includes replicator neural networks. This method is similar to the matrix decomposition-based outlier analysis, in the sense that it also relies on a compression-reconstruction analysis. However, in this case, an analyst may train a multi-layer neural network to compress and reconstruct the data in such a way that the bulk of the data is reconstructed accurately, but outlier are not. This way, the reconstruction error can be directly translated into an outlier score.

Replicator Neural Networks (RNN), or autoencoders, are multi-layer feed-forward neural networks. The input and output layers are composed of a reduced number of nodes. As depicted in FIG. 5, the analyst considers RNNs that are composed of three hidden layers. The first and third hidden layers count p/2 neurons, while the second, central layer is composed of p/neurons, where p is the dimensionality of the data. The tan-sigmoid transfer function is used as an activation function across the network. The network is trained to learn identity-mapping from inputs to outputs. The mapping from inputs to intermediate layers compresses the data. The data may then be decompressed to reconstruct the inputs, mapping the intermediate layers to outputs. This reconstruction may be lossy, this being it intrudes an error, and the training process is aimed at minimizing it. The reconstruction error for the i-th example is given by:

$$e_i = \sum_{j=1}^{p} (x_{ij} - r_{ij})^2 \qquad (3)$$

where the input vector x and the output vector r are both p-dimensional. Given a trained RNN, the reconstruction error is used as the outlier score. Furthermore, test instances incurring a high reconstruction error are considered outliers.

A further statistical outlier detection method that may be employed by an embodiment is a joint probability density based outlier analysis. This detection method is a technique that fits a multivariate model to the data. This technique results in a joint probability distribution that can be used to detect rare events. The outlier score is simply the probability density of a point in the multidimensional space. To build a multivariate model from marginal distributions which are not all Gaussian, some embodiments may exploit copula functions. A copula framework provides a means of interference after modeling a multivariate joint probability distribution from training data.

A copula function $C(u_1, \ldots u_m; \Theta)$ with parameter $\Theta$ is a joint probability distribution of m continuous random variables, each of them uniformly distributed in [0,1]. According to Sklar's theorem, any copula function that takes probability distributions with marginals $F_i(x_i)$ as its arguments defines a valid joint distribution with marginals $F_i(x_i)$. Thus, there may be the ability to construct a joint distribution function for $x_1 \ldots x_m$ with arbitrary marginals as $$F(x_1 \ldots x_m) = C(F_1)(x_1) \ldots F_m(x_m); \theta. \qquad (4)$$

the joint probability density function (PDF) may obtained by taking the $m^{th}$ order derivation of equation (4)

$$f(x_1 \ldots x_m) = \frac{\partial m}{\partial x_1 \ldots \partial x_m} C(F_1(x_1) \ldots F_m(x_m); \theta) \qquad (5)$$

$$= \prod_{i=1}^{m} f_i(x_i) \cdot c(F_1(x_1) \ldots F_m(x_m); \theta)$$

where $c(\bullet)$ is the copula density.

A multivariate Gaussian copula forms a statistical model given by:

$$C_G(u_1 \ldots u_m; \Sigma) = F_G(\Phi^{-1}(u_1) \ldots \Phi^{-1}(u_m); \Sigma) \qquad (6)$$

where $F_G$ is the cumulative distribution function (CDF) of multivariate normal with zero mean vector and $\Sigma$ as covariance, and $\Phi^{-1}$ is the inverse of the standard normal.

Let $\Psi = \{\Sigma, \Psi_i\}_{i=1 \ldots m}$ be the parameters of a joint probability distribution constructed with a copula and m marginal, $\Psi_i$ being the parameter of marginal $i^{th}$. Given N i.i.d observations of the variables $x = (x_{11}, \ldots, x_{mN})$, the log-likelihood function is:

$$L(x; \Psi) = \sum_{i=1}^{N} \log \left\{ \left( \prod_{i=1}^{m} f(x_{xi}; \psi_i) \right) c(F(x_1) \ldots F(x_m); \sum) \right\} \quad (7)$$

Parameters $\Psi$ are estimated via maximum log-likelihood:

$$\Psi = \underset{\Psi}{\operatorname{argmax}} \sum_{i=1}^{N} \log \left\{ \left( \prod_{i=1}^{m} f(x_{xi}; \psi_i) \right) c(F(x_1) \ldots F(x_m); \sum) \right\} \quad (8)$$

In one configuration, the first step in modeling copula density is to model the individual distributions for each of the one or more features, $x_i$. In the present invention, each feature may be modeled using a non-parametric kernel density-based method, described by:

$$f_\sigma(x_i^j) = \frac{1}{n\sigma} \sum_{j=1}^{n} K\left( \frac{x_i^j - \mu}{\sigma} \right) \quad (9)$$

where $K(\cdot)$ is a Gaussian kernel with the bandwidth parameter $\sigma$. Using this method together with the other known features addressed by this disclosure, two problems may be encountered. The first problem is that most of the features produce extremely skewed distributions, making it hard to set the bandwidth for the Gaussian kernel. Therefore, an embodiment may set the bandwidth parameter is set using Scott's rule of thumb. A second problem addressed by this disclosure may be the that some of the variables are discrete ordinal. For copula functions to be useful, the probability density of $u_i=F(x_i)$ should be uniform, and for discrete-valued variables this condition is not met. FIG. 4 shows this using one of the features. The top left plot in FIG. 4 shows the histogram for an original feature $x_i$. The histogram on the right is for $u_i$, which is the CDF values for the feature values. As shown in FIG. 4, the histogram for $u_i$ is not uniform.

As disclosed, some embodiments may perform one or more statistical outlier detection processes including a joint probability process. In some embodiments this joint probability process may comprise identifying discrete variable distributed features derived from the one or more features and adding white Gaussian Copula noise to the discrete variables. This process overcomes the problem of non-uniformity of the probability density of $u_i=F(x_i)$. Therefore, some embodiments may add additive white Gaussian noise to $x_i$. This transformation gives a continuous valued feature, given by $x_i^c$. In the formulation, noise is added to each feature value given by:

$$x_i^c = x_i + \eta(0, n_p) \quad (10)$$

where np is variance of the Gaussian distribution $\eta$ used to add noise. This value is determined by evaluating $$n_p = \frac{P_S}{SNR},$$

where SNR is the desired signal-to-noise ratio. $P_s$ is the signal power, estimated based on the distribution of all values for the feature $x_i$. In the depicted configuration, for most of the features, the SNR value may be set to 20. The bottom left plot of FIG. 4 shows the histogram for the transformed variable $x_i^c$ and the plot on the right shows the histogram for $u_i^c$. This looks closer to uniform.

FIGS. 5A and 5B demonstrate, in some embodiments, the efficacy of Copulas in modeling a bi-variate distribution. The embodiment plotted a scattering plot using the two features using a Gaussian copula with Weibull marginals and overlaid the contours for the density function. The plot of FIG. 5A shows the results. FIG. 5B shows the contours for a bi-variate Gaussian fitted to this data is shown. Is can be seen qualitatively that the joint Copula density function fits the data better. The Copula fits the data better by an order of magnitude when compared to the other processes. FIG. 6 illustrates plots of the histograms for the outlier scores from the three methods employed by the exemplary embodiment and the histogram of the combined score, for one day's worth of data. These scores are after the series of transformations were performed on their raw data. This outcome generates outlier scores matrix from the statistical outliers.

At block 122, process flow continues with generating an outlier scores matrix from each detection method performed. As stated above, in some embodiments, two detection methods may be performed. In other embodiments fewer or further detection methods may be performed to obtain results more readily or more accurately. In some embodiments, each of the outlier scores matrix from the detection methods may be converted to a top scores model, as shown in block 124. The top scores from each of the outlier scores matrix may be combined using a probability model to create a single top scores vector, as shown in block 126.

At block 128, process flow continues with the presentation of the single top scores vector and the adaptive rules model via a graphical user interface. An analyst of the enterprise or e-commerce system may view the top scores vector and the adaptive rules model and may input, via the GUI, label information for the statistical outliers as malicious, non-malicious, or another analyst defined label. Responsive to inputs, embodiments may incorporate the labeled statistical outliers into a labeled features matrix, as shown in block 130. The labeled features matrix identifies one or more rules for identifying threats to the enterprise or e-commerce system.

In some embodiments, the one or more rules comprises a random forest classifier, learning vector quantization, neural network, and combinations thereof. The one or more rules that may be created are essential behavioral rules based on a multidimensional view of the incoming streamed data and/or batch data. Continuing to block 132, an embodiment may create a supervised learning module using the one or more identified threat labels. In some embodiments, this supervised learning module may detect threats in real-time and block and/or challenge the incoming threat. If the threat is detected, the detected threat may be used to modify the one or more statistical models and/or modify the one or more adaptive rules.

The process 100 may be a continuous daily cycle on the enterprise or e-commerce system. Other embodiments may operate on a different cycle as appreciated by those skilled in the art. As shown in FIG. 2, in some embodiments, the supervised learning module updates the identified threats and updates the adaptive rules model. After each cycle of detecting threats, the adaptive rules model modifies the features in block 114 from the incoming data traffic to the enterprise or e-commerce system.

FIG. 7 details a block diagram illustrating an exemplary apparatus configured for training a big data system to defend an enterprise or e-commerce system, in accordance with some embodiments.

In some embodiments, apparatus 300 comprises one or more processors 336, system memory 338, and one or more non-transitory memory units 340, all of which may be directly or indirectly coupled to each other.

Streamed data 311, batch data 313, or a combination thereof, may be fed into the apparatus 300 through a network interface 334 to a features extraction module 316 which comprises code stored on the one or more non-transitory memory units that when executed by the one or more processors are configured to parse the streamed data 311, batch data 313, or a combination thereof, by grouping or bunching log lines belonging to one or more log line parameters and then computing one or more features from the grouped log lines.

Some embodiments may compute the one or more features by executing an activity tracking module, an activity aggregation, or a combination thereof. An exemplary activity tracking module may, as the system absorbs the log stream generated by the platform, identify the entities involved in each log line, e.g. IP address, user etc., and update the corresponding activity records.

Activity records may be calculated and stored according to two guidelines. The first guideline is a very short temporal window. For an example, in one embodiment, the temporal window over which these activity records are computed and stored is one-minute increments. In this embodiment, the computation of behavioral features is computed for different time intervals: –minutes, 1 hour, 12 hours and 24 hours. This allows flexibility in analysis.

The second guideline is having a design streamlined toward efficient retrieval of the user data necessary for feature computation. Depending on the definition of the feature, aggregating activity records for a larger time window can require anything from simple counters to complex data structures. In activity aggregation, computing behavioral features over an interval of time may require two steps. The first step is retrieving all activity records that fall within the given interval.

The behavioral descriptors are aggregated over 24 hours and end at the time of the last user activity. This can be graphically represented as a rolling 24-hour window for feature computation. The second step is to aggregate minute-by-minute activity records as the feature demands. Again, this aggregation step depends on the feature type. In the simplest step, counters, one must merely add all the minute-by-minute values together. The more complex case of unique values requires retrieving the unique values of a super set formed by the minute-to-minute sets.

Streamed data 311 may comprise incoming traffic to an enterprise or e-commerce system. Batch data 313 may comprise web server access logs, firewall logs, packet capture per application, active directory logs, DNS logs, forward proxy logs, external threat feeds, AV logs, user logon audits, DLP logs, LB logs, IPS/IDS logs, black listed URLs, black listed IP addresses, black listed referrers, and combinations thereof. The one or more log line parameters may comprise at least one of: user ID, session, IP address, and URL query. The one or more features may be sent to an adaptive rules model 318 where the adaptive rules model 318 comprises code stored on the one or more non-transitory memory units that, when executed by the one or more processors, are configured to compare the one or more features to predetermined adaptive rules of malicious activities, non-malicious activities or any predetermined rule and blocking one or more features that has one or more identified threat labels, investigating one or more features, or a combination thereof and further generating a features matrix. In the features matrix, the one or more features make up the columns and the one or more log line parameters make up the rows. The features matrix, organized or grouped by sessions, comprises at least one of: user session duration, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, and percentage of head requests in user session. The features of a features matrix, organized or grouped by URL queries, comprises at least one of: length of user URL query, number of characters of user URL query, number of digits of user URL query, and number of punctuations of URL query. The features of a features matrix, organized or grouped by user ID, comprises at least one of: number of checkouts, number of credit cards added, number of promo codes added, number of gift cards added, number of times items were shipped overnight, and number of times new shipping address was added. The features of a features matrix, organized or grouped by IP address, comprises at least one of: number of login failures, number of login successes, number of password resets, and total number of requests.

An embodiment may include a predictive module 319, which comprises code stored on the one or more non-transitory memory units that when executed by the one or more processors are configured to compare the one or more features to predetermined adaptive rules of malicious activities, non-malicious activities or any predetermined rule. The predictive module 319 may block one or more features that has one or more identified threat labels, investigate one or more features, or a combination thereof. Blocking one or more features may prevent a malicious activity by issuing a warning to the system, analyst, or a combination thereof. Investigating one or more features may involve an analyst investigating a labeled feature and determining if the label is correctly or incorrectly labeled, changing the label, or a combination thereof.

The features matrix is then sent to an unsupervised learning module 320 which comprises code stored on the one or more non-transitory memory units that when executed by the one or more processors is configured to use two groups of statistical outlier detection methods, such as matrix decomposition-based method, replicator neural networks process, joint probability density process, to identify statistical outliers.

In some embodiments the one or more log line parameters of the features matrix are ranked by the top scores module 322 and rearranged by probability by the outlier probabilities module 324.

In some embodiments, at least one of: the statistical outliers and the adaptive rules model are presented onto a graphical user interface 346, so that an analyst of the enterprise or e-commerce system may manually identify the statistical outliers as malicious, non-malicious, or another analyst defined label via a keyboard 344 connected to a user input interface 342. The statistical outliers are then labeled as malicious, non-malicious, or other analyst defined label in order to create one or more labeled features matrix. The one or more labeled features matrix is then sent to a supervised learning module 328 which comprises code stored on the one or more non-transitory memory units that, when executed by the one or more processors, are configured to create from the one or more labeled features matrix, one or more rules for identifying threats to the enterprise or e-commerce system.

The one or more rules may comprise a random forest classifier, learning vector quantization, a neural network, and combinations thereof. The one or more rules that are created are essentially behavioral rules based on a multi-dimensional view of the incoming streamed data 311 and/or batch data 313. The one or more rules may be sent to one or more threat detectors (not shown) for real time monitoring of the streamed data 311. The one or more rules may also be posted to a cloud server (not shown) or distributed to other third parties to be used in their firewall rules set. In some embodiments, public labelling data may be input into system rules. In some embodiments, labelling of statistical threats may be publicly available. If threats are not detected by the one or more threat detectors, the incoming data traffic is allowed to continue to the enterprise or e-commerce system. If threats are detected by the one or more threat detectors, the incoming data traffic to the enterprise or e-commerce system may be blocked and/or challenged. In some embodiments, if a threat is detected, the detected threat may be used to modify the unsupervised learning module 320 and/or to modify the one or more adaptive rules generated by the adaptive rules model 318.

In another embodiment, FIG. 8, the process 400 of training a big data machine to defend an enterprise system is applied to the adaptive rules model in block 414. After a continuous cycle, e.g. daily, the system has identified threat labels that are in the adaptive rules model 438. While applying the one or more features to the adaptive rules model, the system identifies features that are identified threats. This data is generated on the GUI along with the output of the single top scores vector and the adaptive rules model to the analyst, as shown in block 432. As the daily cycle continues, the enterprise or e-commerce system modifies such that there is a real-time detection of incoming threats.

FIG. 9 shows an outline of an Active Model Synthesis Framework. The algorithm has three phases-TRAINING, DEPLOYMENT and FEEDBACK COLLECTION/UPDATING-and cycles through these phases daily. The entity-feature matrix and the labeled data serve as the algorithm's inputs. In an everyday workflow, the system trains unsupervised and supervised models, applies these models to that day's incoming data, identifies k entities as extreme events or attacks, and brings them and their data to the analysts' attention. The analysts then use an interface to sort through these rare events and pick out which could truly be attacks. Finally, the labeling deductions are used to build a new predictive model for the next day.

A technique to produce an end-to-end system that may combine analyst intelligence with state-of-the-art machine learning techniques to detect new attacks and reduce the time elapsed between attack detection and successful prevention has been disclosed. Key advantages for the system are that it overcomes limited analyst bandwidth and the weaknesses of unsupervised learning, and it actively adapts and synthesizes new models.

The benefits and advantages that may be provided by the present invention have been described above with regard to specific embodiments. These benefits and advantages, and any elements or limitations that may cause them to occur or to become more pronounced, are not to be construed as critical, required, or essential features of any or all of the claims. As used herein, the terms "comprises," "comprising," or any other variation thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The present disclosure exploits ideas from a wide range of fields, including outlier analysis, ensemble learning, active learning, information security, features analytics and big data computing.

What is claimed is:

1. A method for training a big data machine to defend an enterprise system comprising:
   retrieving log lines belonging to one or more log line parameters from one or more enterprise system data sources and from incoming data traffic to the enterprise system;
   computing one or more features from the log lines;
   wherein computing one or more features includes one or more statistical processes;
   applying the one or more features to an adaptive rules model;
   wherein the adaptive rules model comprises one or more identified threat labels;
   further wherein applying the one or more features to the adaptive rules model comprises: blocking one or more features that has one or more identified threat labels;
   generating a features matrix from said applying the one or more features to the adaptive rules model;
   executing at least one detection method from a first group of statistical outlier detection methods and at least one detection method from a second group of statistical outlier detection methods on one or more features matrix, to identify statistical outliers;
   wherein the first group of statistical outlier detection methods includes a matrix decomposition-based outlier process, a replicator neural networks process and a joint probability process and
   the second group of statistical outlier detection methods includes a matrix decomposition-based outlier process, a replicator neural networks process and a joint probability process;
   wherein the at least one detection method from the first group of statistical outlier detection methods and the at least one detection method from the second group of statistical outlier detection methods are different;
   generating an outlier scores matrix from each detection method of said first and second group of statistical outlier detection methods;
   converting each outlier scores matrix to a top scores model;
   combining each top scores model using a probability model to create a single top scores vector;
   generating a GUI (Graphical User Interface) output of at least one of: an output of the single top scores vector and the adaptive rules model;
   labeling the said output to create one or more labeled features matrix;
   creating a supervised learning module with the one or more labeled features matrix to update the one or more identified threat labels for performing at least one of:
   further refining the adaptive rules model for identification of statistical outliers; and preventing access by categorized threats by detecting new threats in real time and reducing the time elapsed between threat detection of the enterprise system.

2. The method of claim 1, wherein computing one or more features from the log lines includes activity tracking and activity aggregation.

3. The method of claim 1, wherein the output of the single top scores vector comprises less than 100 single outlier scores.

4. The method of claim 1, wherein labeling the output further includes classifying the severity of the threat.

5. The method of claim 1, wherein the adaptive rules comprises malicious activities, non-malicious or any predetermined label.

6. The method of claim 1, wherein the method is repeated daily over a specified time frame.

7. The method of claim 6, wherein the specified time frame comprises at least 2 days.

8. The method of claim 1, wherein the one or more log line parameters comprises at least one of: user ID (Identification), session, IP (Internet Protocol) address, and URL (Uniform Resource Locator) query.

9. The method of claim 1, wherein the one or more enterprise or e-commerce system data sources comprises at least one of: web server access logs, firewall logs, DNS (Domain Name System) logs, forward proxy logs, external threat feeds, AV (Anti-Virus) logs, user logon audits, DLP (Data Loss Prevention) logs, LB (Load Balancer) logs, IPS (Intrusion Prevent System)/IDS (Intrusion Detection System) logs, black listed URLs, black listed IP addresses, and black listed referrers.

10. The method of claim 1, wherein the one or more features comprises at least one of: user session duration, length of user URL query, number of characters of user URL query, number of digits of user URL query, number of punctuations of user URL query, number of requests in user session, average time between clicks in user session, user session click rate, percentage of image requests in user sessions, percentage of 4xx responses in user session, percentage of 3xx in user sessions, percentage of 2xx responses in user session, percentage of zip responses in user session, percentage of binary responses in user session, percentage of head requests in user session, number of checkouts, number of credit cards added, number of promo codes added, number of gift cards added, number of times items were shipped overnight, number of times new shipping address was added, number of login failures, number of login successes, number of password resets, and total number of requests.

11. An apparatus for training a big data machine to defend an enterprise system, the apparatus comprising:
one or more hardware processors;
system memory coupled to the one or more processors;
one or more non-transitory memory units coupled to the one or more processors; and
threat identification and detection code stored on the one or more non-transitory memory units that when executed by the one or more processors are configured to perform a method, comprising:
retrieving log lines belonging to one or more log line parameters from one or more enterprise system data sources and from incoming data traffic to the enterprise system;
computing one or more features from the log lines;
wherein computing one or more features includes one or more statistical processes;
applying the one or more features to an adaptive rules model;
wherein the adaptive rules model comprises one or more identified threat labels;
further wherein the applying the one or more features to the adaptive rules model comprises: blocking one or more features that has one or more identified threat labels, investigating one or more features, or a combination thereof;
generating a features matrix from said applying the one or more features to the adaptive rule model;
executing at least one detection method from a first group of statistical outlier detection methods and at least one detection method from a second group of statistical outlier detection methods on one or more features matrix, to identify statistical outliers;
wherein the first group of statistical outlier detection methods includes a matrix decomposition-based outlier process, a replicator neural networks process and a joint probability density process and the second group of statistical outlier detection methods includes a matrix decomposition-based outlier process, a replicator neural networks process and a density-based process;
wherein the at least one detection method from the first group of statistical outlier detection methods and the at least one detection method from the second group of statistical outlier detection methods are different;
generating an outlier scores matrix from each detection method of said first and second group of statistical outlier detection methods;
converting each outlier scores matrix to a top scores model;
combining each top scores model using a probability model to create a single top scores vector;
generating a GUI (Graphical User Interface) output of at least one of: an output of the single top scores vector and the adaptive rules model;
labeling the said output to create one or more labeled features matrix;
creating a supervised learning model with the one or more labeled features matrix to update the one or more identified threat labels for performing at least one of:
further refining the adaptive rules model; and
preventing access by categorized threats by detecting new threats in real time and reducing the time elapsed between threat detection of the enterprise system.

12. The apparatus of claim 11, wherein computing one or more features from the log lines includes activity tracking and activity aggregation.

13. The apparatus of claim 11, wherein the output of the single top scores vector comprises less than 100 single outlier scores.

14. The apparatus of claim 11, wherein labeling the output further includes classifying the severity of the threat.

15. The apparatus of claim 11, wherein the adaptive rules comprises malicious activities, non-malicious or any predetermined label.

16. The apparatus of claim 11, wherein the method is repeated daily over a specified time frame.

17. The apparatus of claim 11, wherein the specified time frame comprises at least 2 days.

18. The apparatus of claim 11, wherein the one or more log line parameters comprises at least one of: user ID, session, IP address, and URL query.

19. The apparatus of claim 11, wherein the one or more enterprise or e-commerce system data sources comprises at least one of: web server access logs, firewall logs, DNS (Domain Name System) logs, forward proxy logs, external threat feeds, AV logs, user logon audits, DLP logs, LB (Load Balancer) logs, IPS (Intrusion Prevent System)/IDS (Intrusion Detection System) logs, black listed URLs, black listed IP addresses, and black listed referrers.

* * * * *